Nov. 27, 1962  C. V. BOCCIARELLI  3,066,239
BEAM-PERCEPTIVE DEVICE FOR CATHODE-RAY TUBE SYSTEMS
Filed Dec. 1, 1950  3 Sheets-Sheet 1

INVENTOR.
CARLO V. BOCCIARELLI
BY
Allan V. Hazeltine
ATTORNEY

Nov. 27, 1962 C. V. BOCCIARELLI 3,066,239
BEAM-PERCEPTIVE DEVICE FOR CATHODE-RAY TUBE SYSTEMS
Filed Dec. 1, 1950 3 Sheets-Sheet 2

INVENTOR.
CARLO V. BOCCIARELLI
BY
ATTORNEY

FIG. 1A.

United States Patent Office 3,066,239
Patented Nov. 27, 1962

3,066,239
BEAM-PERCEPTIVE DEVICE FOR CATHODE-RAY TUBE SYSTEMS
Carlo V. Bocciarelli, Philadelphia, Pa., assignor, by mesne assignments, to Philco Corporation, Philadelphia, Pa., a corporation of Delaware
Filed Dec. 1, 1950, Ser. No. 198,709
33 Claims. (Cl. 315—31)

The present invention relates to means for producing signals which are a predetermined function of the position of a cathode-ray beam, and more particularly, to means for developing and utilizing such signals to control the sequential application of color television signals to the intensity-controlling electrode of a trichromatic cathode-ray tube.

There are a variety of circumstances in which it is desirable to produce, and to utilize, signals whose times of occurrence are indicative of those times at which a cathode-ray beam attains predetermined positions. For example, in the copending application No. 547,621 of David E. Sunstein, filed November 18, 1955, as a continuation of application No. 185,106, filed September 15, 1950, now abandoned, there is described a color television image-presentation system utilizing a single cathode-ray tube having a screen member comprising vertical stripes of luminescent materials which respond to electron impingement to produce light of three different primary colors. These stripes are preferably arranged in laterally-displaced color triplets, each triplet comprising three vertical phosphor stripes producing light of different primary colors, the order of arrangement of which stripes may be such that the normal, horizontally-scanning cathode-ray beam produces red, blue, and green light successively. From a color television receiver there are then supplied three separate video signals, each indicative of a different primary color component of a televised scene, which signals are sampled sequentially and utilized to control the intensity of the cathode-ray beam. For proper color rendition, it is then required that, as phosphor stripes producing each of the primary colors of light are impinged by the cathode-ray beam, the intensity of the beam be simultaneously controlled in response to the contemporaneous value of the video signal representing the corresponding color component of the televised scene. However, since the rate at which the beam scans across the phosphor stripes of the screen may be variable, due, for example, to non-linearity of the beam-deflecting signal, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected.

In the above-cited copending application, there is disclosed and claimed an arrangement employing spectrally-selective photoelectric devices for producing signals indicative of the cathode-ray beam position, together with means for utilizing these signals to control the times at which samples of the several color signals are applied to the intensity-controlling electrode of the cathode-ray tube. The present invention is concerned, in one aspect, with another and improved arrangement for producing and utilizing such beam-position-indicating signals.

Although it will be convenient to describe the invention particularly with reference to a system which utilizes the signals indicative of the beam position for purposes of timing the sampling of color signals in a color television receiver, it will be obvious from the following that the invention is no way dependent upon such use, and that the signals produced by the arrangement of the invention may be utilized for other purposes as well. For example, use may be made of the invention in effecting linearization of the deflection of a cathode-ray beam, in accordance with the disclosure of U.S. Patent No. 2,476,698 of R. G. Clapp, issued July 19, 1949.

Signals indicative of the position of a cathode-ray beam have been produced in the past by utilizing light-responsive devices so located as to be subject to illumination by light from the cathode-ray tube screen. While adequate for some purposes, such arrangements possess inherent limitations which render them disadvantageous in certain practical applications. For example, in photoelectric indexing systems utilized in conjunction with phosphor-striped cathode-ray tubes, it is generally desirable not only to provide the photoelectric device with illumination from all portions of the scanned area of the cathode-ray tube screen, but also to protect it from stray light originating at other sources, including that which may be reflected from the glass envelope of the cathode-ray tube. Such photoelectric systems should also be arranged so as to provide no substantial interference with the viewing of the cathode-ray tube screen by an observer. In addition, substantial variations in the attenuation of the light path between the cathode-ray tube screen and the photoelectric device, which may occur due to the interposition of foreign objects such as dust or dirt, must generally be prevented from occurring. When the photoelectric device is mounted forward of the cathode-ray tube screen, the provision of a mounting and shielding arrangement directed to the simultaneous satisfaction of the above-mentioned requirements often entails considerable expense, and, if the photoelectric device is mounted interior to the envelope of the cathode-ray tube, corresponding difficulties and expense may be incurred in the manufacture of the cathode-ray tube structure. In either event, the inherent susceptibility of such photo-electric systems to fortuitous variations in illumination is apparent.

Accordingly, it is an object of my invention to provide novel means for producing and utilizing signals indicative of the position of a cathode-ray beam.

It is another object of my invention to provide such a system which is not dependent upon illumination for its operation, and which is susceptible of convenient and economical incorporation in a commercial television receiver.

A further object is to provide a color television image-forming system of the class which employs a cathode-ray tube screen member having regions differently responsive to electron impingement to produce light of differing colors, in which system proper time coincidence is automatically maintained between the application to the cathode-ray tube of beam-intensity controlling signals representative of predetermined color components of a television scene, and the impingement of the cathode-ray beam upon regions of the screen member producing light of corresponding coloration.

The above objects are achieved in accordance with the invention by employing a cathode-ray tube having disposed therein a beam-interceptive structure comprising beam-position-indicating elements arranged in predetermined geometric relation to other regions of the beam-interceptive structure. These beam-position-indicating elements are characterized by values of secondary-emission ratio which differ from those characterizing other regions of the beam-interceptive structure, when bombarded by electrons of the cathode-ray beam. Means are also provided which are responsive to secondary-emission currents from the beam-interceptive structure to produce output signals having instantaneous values which are determined by the secondary-emission ratios of the contemporaneously-impinged regions of the beam-interceptive structure. Since the beam-position-indicating elements possess predetermined distinctive values of secondary-emission ratio, corresponding distinctive and predetermined values of output signals are produced upon impingement thereof by the beam. By employing a suitable amplitude-discriminatory device responsive only to values of output signal produced in response to impingement of beam-position-indicating elements, signals may be derived, or actuation of an energy utilization device effected, in predetermined time relationship to impingement of the beam-position-indicating elements.

Since the beam-position-indicating elements are located in predetermined geometric relation to the beam-interceptive structure, the signals indicative of the impingement of these elements are also indicative of the position of the cathode-ray beam. Beam-position-indicating signals derived in this manner may generally be utilized to effect indexing of sequential color signals with respect to the impingement of corresponding color stripes of a trichromatic cathode-ray tube screen, and such signals will therefore, for convenience only, be referred to hereinafter as indexing signals, while the beam-position-indicating elements will be referred to as indexing elements, without implying that these entities are useful only in connection with indexing systems.

When the beam-interceptive structure of the cathode-ray tube also comprises an image-forming screen, the indexing elements of the beam-interceptive structure may be disposed near the screen, or may actually comprise an integral part thereof, and are preferably arranged, either by their geometric position or by their transparency to the electron beam, to avoid debilitating interference with activation of the screen by the cathode-ray beam.

More particularly, a preferred embodiment of the invention employed in connection with a trichromatic color television system employing a single, vertically-striped, trichromatic cathode-ray tube for image presentation, may utilize a grid of indexing elements vertically-disposed upon the screen of the cathode-ray tube and arranged in predetermined geometric relation to triplets of phosphor stripes, which indexing elements are so constituted as to possess a relatively high secondary-emission ratio compared to that of other regions of the cathode-ray tube screen. Thus the surface of the phosphor screen presented to the cathode-ray beam may be coated with a conductive film of low secondary-emission ratio, upon which the grid of indexing elements may be located in the form of a deposit of highly secondary-electron emissive stripes. When this structure is scanned by the cathode-ray beam, the secondary-emission current therefrom tends to assume its maximum values upon impingement of indexing elements. Impedance means serially connected in the path of the secondary emission current may then be utilized to produce corresponding output signals of proportionate magnitudes, which signals also attain their peak values upon the impingement of indexing stripes. These output signals may be divided into three portions, which are then differently delayed, so that the peak values of each of the separate signal portions occur contemporaneously with the impingement of stripes of a different color. Each of the three signal portions may then be applied to a suitable amplitude-discriminatory device which produces sampling signals only upon the occurrence of peaks of the signal portion supplied thereto, which are conetmporaneous with the impingement of stripes of a predetermined color. The three separate sampling signals thus derived may then be utilized to control the application of color samples to the intensity-controlling electrode of the cathode-ray tube.

In color television systems of the latter type, the widths of the color stripes are often so small that a very fine scanning spot must be employed, and, as a result, high accelerating potentials must be utilized in the cathode-ray tube if a brilliant color image is to be formed. Under these conditions, the electrons bombarding the cathode-ray tube screen are possessed of very high energies, in which circumstance secondary-emission ratios comparable to those obtainable in response to bombardment by low-energy electrons are not necessarily realizable by the well-known methods of surface treatment of materials. However, it has been found that by constructing the above-mentioned indexing grid structure of a material having an atomic number which differs substantially from that of other materials subject to impingement by the beam, adequate differences in secondary-emission ratio may be realized as between the indexing structure and other impinged regions. For example, it has been found that the grid of indexing elements may suitably comprise stripes of gold, having an atomic number of 79, while the remainder of the region subject to impingement by the cathode-ray beam may be coated with a relatively thin conductive film of aluminum, having an atomic number of 13. A detectable difference in secondary-emission current from the cathode-ray tube screen may then be obtained when the beam travels from the aluminum film to a gold indexing stripe.

In certain applications of the present invention in which the intensity of the cathode-ray beam is maintained constant, or is subject to only slight modulation, variations in the secondary-emission current of the cathode-ray tube due to differences in the secondary-emission ratio of the various regions of the screen are readily detected and converted into suitable beam-position-indicating signals. Furthermore, variations in secondary-emission current due to differences in secondary-emission ratio may also be readily distinguished even when the intensity of the cathode-ray beam is subject to substantial variations, provided that large differences in secondary-emission ratio exist between the materials of the indexing elements of the beam-interceptive structure and the remaining portions thereof. However, in applications of the invention in which the intensity of the cathode-ray beam is subject to large variations, while large differences in secondary-emission ratios cannot be realized, special means are generally desirable for distinguishing those variations produced in the secondary-emission current in response to differences in secondary-emission ratio of the cathode-ray tube screen from those variations occasioned by modulation of the incident beam intensity, an example of which means is described in detail hereinafter.

The exact geometry and composition of the various portions of the beam-interceptive structure, as well as the particular circuit arrangement by which suitable indexing signals are produced in response to variations in secondary-emission current, are susceptible of a variety of embodiments when utilized in different specific applications, as is indicated by the detailed description which follows.

Other features and advantages of the invention, as well as the mode of operation thereof, will be more fully comprehended from a consideration of the following detailed description in connection with the accompanying drawings, in which.

The term "secondary-emission ratio," as employed herein, is the average number of secondary electrons emitted from a substance for each primary electron impinging thereupon. As is well known, the secondary-emission ratio of a material depends upon the energies of the impinging electrons, generally exhibiting a marked diminution as the energies of the impinging electrons are increased to high values. When the energies of the impinging electrons lie in a low-energy range, for example 100 to 500 electron volts, the secondary-emission ratio is determined principally by the composition and condition of the surface upon which impingement takes place. However, when the energies of the impinging electrons are great, for example 10,000 electron volts or more as may often be the case in color television systems using striped screens requiring fine spot size, the secondary-emission ratio generally is relatively low substantially regardless of the nature of the surface of the material. Nevertheless, it has been found that the secondary-emission ratio under these conditions is generally greater for those materials having higher atomic numbers. Advantage is taken of this fact in a preferred embodiment of the invention described hereinafter, to obtain substantial differences in secondary-emission ratio in response to impingement by high energy electrons, by utilizing materials of substantially different atomic numbers.

Figures 1, 2, 3, 7, 8:
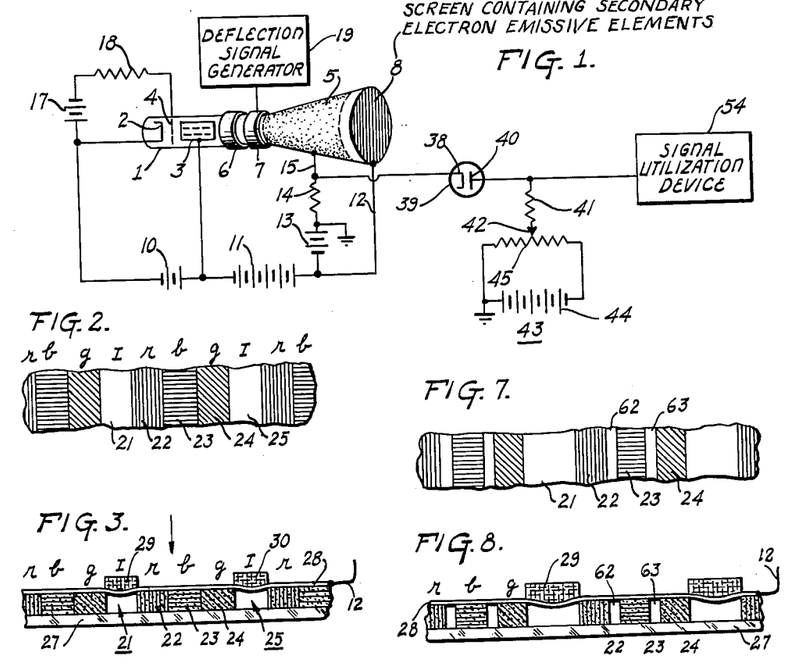
FIGURE 1 is a diagram, partly schematic and partly in block form, of a simplified embodiment of the invention which is useful in certain applications.
FIGURE 2 is an enlarged front view of a region of a beam-interceptive indexing screen member which may be employed in the arrangement of FIGURE 1.
FIGURE 3 is an enlarged top view of this same screen region.
FIGURE 7 is an enlarged front view of a portion of a beam-interceptive screen member which is particularly useful in connection with the system of FIGURE 6.
FIGURE 8 is a top view of the latter screen region.

The embodiment of the invention represented in FIGURE 1 is operative to produce output signals which comprise distinct indications of the attainment of predetermined positions by a cathode-ray beam, provided that the beam intensity is not subject to extreme variations. It may therefore readily be employed in a system for controlling a deflection signal generator supplying a first cathode-ray tube, the beam of which tube may be maintained at a constant intensity, so as to produce a deflection signal of predetermined form which may then be applied to the beam deflecting elements of a second and similar cathode-ray tube to produce similar deflection, the cathode-ray beam of which latter tube may then be varied in intensity in any desired manner. A system of this general class is disclosed in U.S. Patent No. 2,457,911 of A. C. Munster, issued January 4, 1949. Even when the beam-intensity is subject to substantial modulation, the arrangement of FIGURE 1 may be utilized in sweep-linearizing systems such as that described in U.S. Patent No. 2,476,698 of R. G. Clapp, issued July 19, 1949, by utilizing frequency-discriminatory filtering means to select only the fundamental component of the indexing signals, and by then employing these filtered signals to control the beam-deflecting oscillator in a manner described in the last-named patent. As will become apparent hereinafter, the embodiment of FIGURE 1 may also be utilized, in certain instances, in connection with color television systems, to control the indexing of a sequence of color signals with respect to the impingement of corresponding color stripes by the beam of a trichromatic cathode-ray tube.

Referring now to FIGURE 1, in detail, the embodiment represented therein employs a cathode-ray tube 1 which may be provided with conventional elements for producing and deflecting a focused cathode-ray beam so as to scan a television raster upon the cathode-ray tube screen. Thus there may be employed an electron-emissive cathode 2, a beam-forming first anode 3, a beam-intensity controlling electrode 4, a beam-accelerating second-anode 5, a focusing coil 6, and a beam-deflecting yoke 7. In addition, there is employed a special beam-interceptive screen member 8, which the beam is adapted to scan, and which will be described in detail hereinafter.

First anode 3 is maintained at a positive potential with respect to cathode 2 by the connection of the negative terminal of potential source 10 to the cathode 2 and connection of the positive terminal thereof to first anode 3. Screen member 8 is maintained positive with respect to first anode 3 by means of potential source 11, which has its negative terminal connected to first anode 3 and its positive terminal connected to screen member 8 through screen lead 12, while second-anode 5 is preferably maintained positive with respect to screen member 8 by means of potential source 13, the negative terminal of which connects to screen member 8 and the positive terminal of which supplies potential to second-anode 5 by way of resistor 14 and second-anode lead 15.

Intensity-controlling electrode 4 is biased negatively with respect to cathode 2 by means of potential source 17 and grid resistor 18, the negative bias thus supplied being less than that required to cut off the cathode-ray beam completely. It is understood that focusing coil 6 is supplied with a suitable current for producing a focused beam at screen member 8, while deflection yoke 7 is supplied from deflection signal generator 19 with appropriate signals for causing the cathode-ray beam to sweep across the same screen member.

Beam-interceptive screen member 8 may comprise a plurality of vertically-elongated laterally-displaced indexing elements disposed in predetermined geometric arrangement, and, when the system of FIGURE 1 is to be used as an image-presentation device, the interstices between indexing elements may be occupied by phosphor materials responsive to electron impingement to produce visible light. In particular, when the system is to be used to produce color images in response to a dot-sequential color signal applied to intensity-controlling electrode 4, the regions between each pair of successive indexing elements may comprise three parallel phosphor stripes responsive to electron impingement to produce light of three different primary colors. A representative region of such a screen member is shown in detail in FIGURES 2 and 3.

Referring to FIGURE 2, which represents an enlargement of a portion of screen member 8 as viewed from the front, the screen member 8 is seen to comprise a plurality of vertical stripe regions such as 21, 22, 23, 24, 25, of which regions 22, 23, 24 comprise a color triplet of phosphor stripes. Thus, phosphor stripe 22 is vertically disposed upon screen member 8, and may be termed a "red" stripe in that it responds to electron impingement to produce light which is principally of a red color. Similarly, "blue" stripe 23 and "green" stripe 24 respond to electron bombardment to produce principally blue and green light, respectively. Stripe regions such as 21 and 25, which separate successive color triplets, contain no phosphor, and instead are occupied by indexing stripes as is shown more clearly in FIGURE 3. It is understood that the stripe regions shown in FIGURE 2 extend vertically over the entire scanned area of screen member 8.

Referring to FIGURE 3, this form of screen member 8 is seen further to comprise a glass plate 27, which may be the large end of the envelope of cathode-ray tube 1, upon which are disposed the vertical phosphor stripes such as 22, 23, and 24. The assembly comprising the glass plate 27 and the phosphor stripes disposed thereon, is coated on the surface exposed to the cathode-ray beam with a thin conductive film 28. This may readily be accomplished by first depositing a lacquer film upon the surface to be coated, settling the conductive film upon the lacquer film, and then baking out the lacquer, in accordance with techniques well-known in the art. Upon the conductive film, and in registry with regions such as 21 and 25 which separate successive color triplets, there are located indexing stripes such as 29 and 30, which may be formed by evaporation of a suitable metal upon the conductive film through an appropriate mask, for example. These indexing stripes comprise a material having a secondary-emission ratio, in response to impingement by the cathode-ray beam, which differs substantially from that of conductive film 28.

For example, the secondary-emission ratio of the indexing stripes may be made large compared to that of conductive film 28. This may be accomplished by constituting the conductive film 28 of aluminum, which material is particularly advantageous in increasing the brightnesses of images which may be formed on screen member 8, and, when relatively low second-anode potentials of the order of 500 volts are employed, by fabricating the indexing stripes of any of a variety of well-known materials, which possess high secondary-emission ratios upon bombardment by low-energy electrons. Typical of such materials are certain mixtures which include cesium and its oxide as constituents, such as the well-known, highly secondary-electron emissive mixture of cesium, cesium oxide, and silver. When high second-anode potentials of the order of 20 kilovolts are employed, the indexing stripes may suitably be composed of a material such as gold having an atomic number differing substantially from that of aluminum.

Alternatively, the secondary-emission ratio of the indexing elements may be made to differ in the opposite sense from that of conductive film 28, so that the indexing stripes possess a secondary-emission ratio which is substantially less than that of conductive film 28, by interchanging the materials of which the indexing stripes and conductive film are composed. Further, it is not generally necessary that the indexing stripes and the conductive film each be characterized by but a single value of secondary-emission ratio, so long as their respective secondary-emission ratios lie in mutually exclusive ranges of values. It is also to be noted that, in some arrangements of screen member 8, the secondary-emission ratios of the indexing elements may lie in a plurality of spaced ranges of values, between which ranges are located values of secondary-emission ratio characterizing the conductive film, or, the conductive film may possess values of secondary-emission ratio lying in separated ranges between which are located values of secondary-emission ratio characterizing the indexing stripes. In each of the above instances, the indexing stripes are characterized by distinctive secondary-emission ratios which differ substantially from those of other regions of the complete beam-interceptive structure.

It is understood that the dimensions of the phosphor stripes and of the indexing stripes 29 and 30, as represented in FIGURES 2 and 3, have been chosen for simplicity and clarity of representation only, and are not to be construed as necessarily representative of the actual physical dimensions employed. Thus, conductive film 28 is actually sufficiently thin to permit ready penetration by the cathode-ray beam so as to provide substantially normal activation of the phosphors, while the thicknesses of the phosphor stripes, as well as of the indexing stripes, are generally much smaller relative to their widths than is indicated in the drawings.

Although the use of conductive film 28 in the described manner is particularly advantageous in certain applications, due to the increased image brightness which it affords, the variety of choice of secondary-emission ratio which is permitted by appropriate selection of the material which it comprises, the uniformity of secondary-emission ratio for regions other than indexing stripes which may be obtained by its use, and the practical advantage which it possesses in many applications in its provision of a suitable metallic surface upon which metallic indexing stripes may accurately and securely be deposited, nevertheless its use is not essential to the practice of the invention in all of its forms. Thus, a beam-interceptive structure in which the conductive film 28 is omitted, is represented in FIGURE 4, in which arrangement the cathode-ray beam is permitted to impinge the phosphor stripes directly, and in which the indexing elements are spaced from the phosphor stripes in the direction of the source of the cathode-ray beam.

Figure 4:
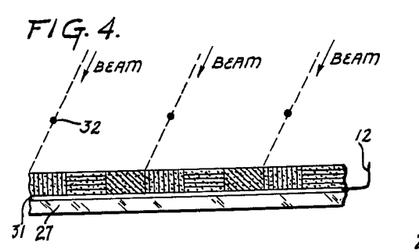
FIGURE 4 is an enlarged top view of a region of another beam-interceptive structure which also may be used in the system of FIGURE 1.

Referring to FIGURE 4, in the beam-interceptive structure represented therein, there is again employed a supporting glass plate 27, but in this case the surface of the plate upon which the phosphor stripes are formed is caused to be electrically conductive, yet substantially transparent to light. This may be accomplished by evaporating a thin film 31, which may be of tungsten or similar metal, upon the surface to be rendered conductive, which film preferably has the least thickness which can be used to obtain the desired conductivity, so as to obtain the greatest possible transparency to light. Alternatively, one of the commercially available types of glass having transparent conductive surfaces may be utilized for this purpose. Screen lead 12 is then connected to the conductive surface 31, so as to supply the screen with a substantially uniform potential.

The indexing elements may then comprise vertically-disposed wires such as 32, which are arranged so as to be impinged by the beam when it is directed at regions separating the colored-phosphor triplets. These wires may be spaced from the phosphor stripes in the direction of the source of the cathode-ray beam, and may be mechanically mounted by any of a variety of means well known in the art of vacuum tube fabrication. For portions of screen member 8 which are not subject to substantially normal impingement by the beam, the indexing wires are laterally displaced with respect to the regions between successive color triplets, as is indicated generally in the figure, so as to be impinged when the beam is directed toward these latter regions. When the cathode-ray beam is subjected to relatively low accelerating potentials, the indexing wires such as 32 may be coated with one of the well known mixtures of materials, such as those referred to hereinbefore, which are characterized by high secondary-emission ratios in response to low-energy electrons, while when high accelerating potentials are utilized, gold, platinum or tungsten wires may be employed.

Figure 5:
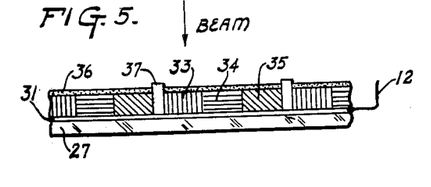
FIGURE 5 is an enlarged top view of a portion of still another beam-interceptive screen member which may be employed in the system of FIGURE 1.

Screen member 8 may also be of a type represented in FIGURE 5, which employs a homogeneous phosphor layer producing substantially white light, in combination with triplets of spectrally-selective glass strips. Thus there may again be employed the glass plate 27 having a conductive surface 31, and to which there is affixed a structure comprising a plurality of glass strips arranged in groups of three, between which groups there are located elongated indexing strips of metal arranged parallel to the glass strips and having their wider cross-sectional dimension disposed normal to the plane of the screen member. The color triplets in this case each comprise a glass filter strip such as 33 which selectively transmits principally red light, another adjacent glass strip such as 34 which transmits principally blue light, and a third glass strip such as 35 which transmits principally green light. The surface of the glass strips nearer the source of the cathode-ray beam is coated with a "white" phosphor 36, which responds to electron impingement to produce substantially white light. The indexing strips, such as 37, which are located between successive triplets of glass strips, are of sufficient width so that they extend from the conductive surface of plate 27 to the surface of the white phosphor and protrude therethrough toward the source of the cathode-ray beam, the edges of these metal strips which are presented to the beam being free of phosphor. The metal strips are so constituted as to possess a secondary-emission ratio substantially higher than that of the white phosphor upon impingement by the cathode-ray beam, either by coating of the edges thereof with a highly secondary-electron emissive film or by appropriate selection of the material comprising the strips, in accordance with the general principles outlined hereinbefore. It is noted that this screen structure is similar to those described with reference to FIGURES 3 and 4, in that the laterally-scanning cathode-ray beam produces red, blue, and green light successively upon impingement of adjacent regions of the screen, and also produces a pulse of secondary-emission current when the beam is directed at regions separating successive color triplets.

Referring again to FIGURE 1, in the operation of the portion of the system thus far described, the cathode-ray beam is caused to scan across screen member 8, thereby producing secondary-emission currents therefrom. The magnitude of the secondary-emission current produced at any time depends upon the secondary-emission ratio of the region of screen member 8 subject to electron bombardment at that time. Thus the secondary-emission current $i_1$ produced in response to a cathode-ray beam current $i_0$ is equal to the product ($i_0 R$) of the beam current and the secondary-emission ratio $R$ of the impinged region of the screen. The secondary-emission current therefore has a magnitude indicative of the secondary-emission ratio of the impinged material.

The secondary electrons emitted by screen member 8 are collected by second-anode 5, which is maintained somewhat positive with respect to screen member 8 to facilitate such collection. Means are then provided for producing voltage signals which are substantially proportional to the current collected by second-anode 5. For this purpose, resistor 14 is included serially in the path of the secondary-emission current through the external circuit, and there is therefore produced at second-anode lead 15 a voltage, with respect to ground, which is negative by an amount proportional to the secondary-emission ratio of the region of screen member 8 which is impinged at any time. Thus, when the beam-intensity is substantially constant, to each value of secondary-emission ratio of screen member 8 there corresponds a predetermined value of negative voltage at second-anode lead 15. To detect those times at which the beam impinges indexing elements of screen member 8, there are employed amplitude-discriminatory means for selecting only those signals having values indicative of the secondary-emission ratios characterizing the indexing elements. The precise structure of the amplitude-discriminatory device which is employed generally depends in part upon the relation of the secondary-emission ratios of the indexing elements to those of the remainder of screen member 8. In connection with the amplitude-discriminatory device represented in FIGURE 1, it is assumed that the secondary-emission ratios of the indexing stripes are greater than those of other impinged regions of screen member 8, as will be the case, for example, when the surface of the screen member presented to the cathode-ray beam is coated with a conductive film of aluminum, and when the indexing elements comprise gold stripes deposited upon the impinged surface of the conductive film as described hereinbefore.

Second-anode lead 15 is then connected to the cathode 38 of diode vacuum tube 39, the anode 40 of which is connected through a resistor 41 to the adjustable tap 42 of a potentiometer device 43. Potentiometer device 43 comprises a potential source 44, the positive terminal of which is grounded, and between the terminals of which there is connected a resistive element 45 with which adjustable tap 42 makes sliding connection. By suitable adjustment of the position of tap 42, any desired negative bias voltage may be supplied to anode 40. Since diode 39 conducts only when its cathode 38 is negative with respect to its anode 40, the signals supplied to cathode 38 from second-anode lead 15 must be more negative than the biasing voltage supplied to anode 40 in order that current may be produced in resistor 41. Voltages are therefore produced across resistor 41 only when the secondary-emission ratio of the region of screen member 8 subject to impingement at any time is sufficiently great to produce voltage signals at second-anode lead 15 which are more negative than the bias voltage applied to diode 39. This bias voltage is adjusted to a value which is less than the negative voltage produced at second-anode 5 in response to impingement of the indexing stripes, so as to permit the production of indexing signals across resistor 41 upon impingement of such stripes, but greater than the voltages produced at second-anode 15 upon impingement of other regions of screen member 8, so as to prevent the production of signals across resistor 41 at such other times. Voltage signals produced across resistor 41 therefore comprise indications of the impingement of indexing stripes.

If screen member 8 is arranged so that the secondary-emission ratios of the indexing stripes are less than those of other regions of the screen member, as by utilizing a conductive film 28 which is of gold together with indexing stripes of aluminum, the amplitude-discriminatory device described above may again be utilized, but in this instance the impingement of indexing stripes will be indicated by the absence of voltage across resistor 41. Other types of amplitude-discriminatory device which may be employed to detect the impingement of indexing elements in the event that other regions of screen member 8 are characterized by secondary-emission ratios both higher and lower than those of the indexing stripes, will readily occur to those skilled in the art. Similarly, the manner in which amplitude-discriminatory devices of the latter type may be connected in parallel to detect the impingement of indexing elements having secondary-emission ratios lying in a plurality of separate ranges, will also be readily apparent to such persons.

The amplitude-discriminatory device described above is therefore adjusted so as to produce output signals only in response to the impingement of the indexing stripes. Since these indexing stripes occupy predetermined regions of screen member 8, the signals produced across resistor 41 in response to impingement of indexing stripes then constitute indications of the contemporaneous impingement of these screen regions of known location and hence of the position of the cathode-ray beam.

Signals from the amplitude-discriminatory device may then be applied to signal utilization device 54, which may employ the beam-position-indicating signals thus produced for any of a variety of purposes, some of which have been indicated hereinbefore. Thus, signal utilization device 54 may supply signals to deflection signal generator 19 to effect linearization of the cathode-ray tube sweep in accordance with the disclosure of the cited patent of R. G. Clapp. In this event, signals from deflection signal generator 19 may also be supplied to another cathode-ray tube similar to cathode-ray tube 1, to produce a linear sweep therein, and thereby to render said second tube properly responsive to periodically-recurring dot-sequential color signals so as to produce an acceptable color image upon the screen thereof. In this event, it is not necessary for screen member 8 to employ the arrangement of phosphor materials described above.

Figure 1A:
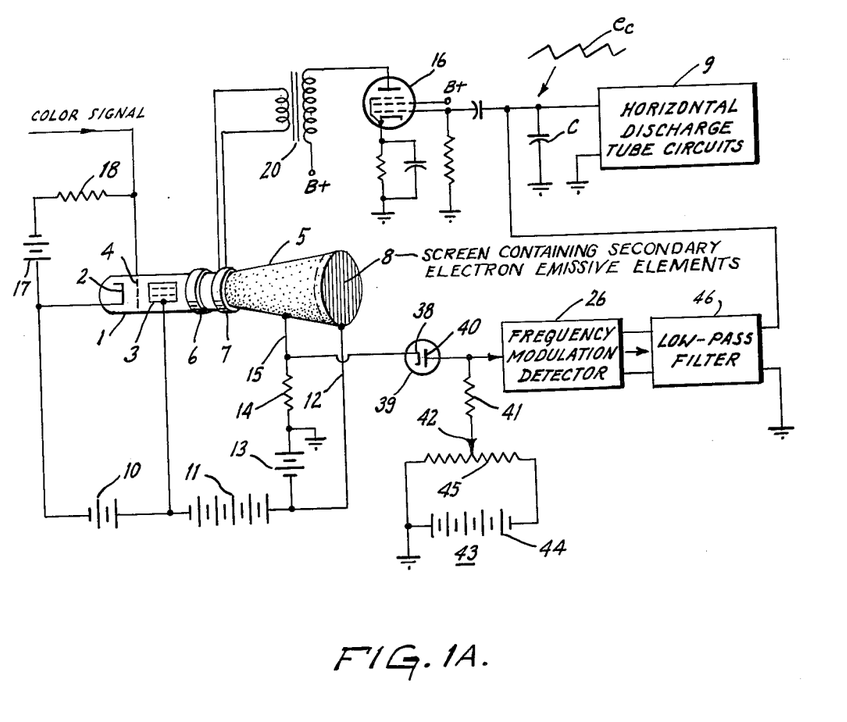
FIGURE 1A is a similar diagram showing one of said applications.

Alternatively, when the indexing signals are utilized to linearize the sweep of cathode-ray tube 1, dot-sequential color signals may be applied to intensity-controlling electrode 4 of cathode-ray tube 1, in which event a color image is formed upon screen member 8. FIGURE 1A shows the system of FIGURE 1 employing the Clapp arrangement for linearization of the sweep of cathode-ray tube 1. As described in the Clapp patent, the horizontal discharge circuits 9 develop a sawtooth voltage wave $e_c$ across the capacitor C, and by means of the horizontal output pentode 16 and the coupling transformer 20 a sawtooth current wave is supplied to the horizontal deflection coil of yoke 7. The indexing signals are supplied to the frequency modulation detector 26 which, as described in the Clapp patent, varies the charge of capacitor C to control the wave shape of the voltage $e_c$ so as to maintain the proper velocity of the beam of tube 1. As described in the Clapp patent, a low-pass filter 46 may be provided to reject any relatively higher frequencies that may be present in the output of the detector 26, the output of the filter being connected in shunt with capacitor C. In order that substantial variations in the intensity of the cathode-ray beam may be accommodated in the system of FIGURE 1A without producing intolerable interference with the production of distinct indexing signals, it is desirable that large differences exist between the secondary-emission ratios of the indexing stripes and those of other portions of screen member 8. As indicated hereinbefore, such large differences may most readily be realized in systems utilizing low second-anode potentials, in which the indexing stripes comprise a surface coating of a material of very high secondary-emission ratio, such as the previously mentioned mixtures of cesium and its oxides, and in which conductive film 28 is of a metal characterized by a low secondary-emission ratio in response to impingement by low-energy electrons.

While the arrangement represented in FIGURE 1 may be utilized in certain instances to produce color images, it is subject to the limitation that distinct indexing signals are not readily producted when the variations of the intensity of the cathode-ray beam are permitted to become large compared to the differences between the secondary-emission ratios of the indexing stripes and those of the remainder of screen member 8. This is by virtue of the fact that the secondary-emission current which produces the indexing signals is proportional not only to the secondary-emission ratio of the portion of the screen member 8 which is impinged by the cathode-ray beam, but also to the intensity of the impinging beam. Now in most practical color television systems, it is necessary to use large accelerating potentials at the second-anode of the cathode-ray tube, in order to provide a bright color image while maintaining the relatively small spot size which is desirable when phosphor stripes of small width are employed. When such high accelerating potentials are employed, the energies of the impinging electrons are so great that the secondary-emission ratios of most materials assume low values, and the indexing signals produced by an arrangement such as that of FIGURE 1 are not at all times entirely distinct when the beam is subjected to substantial intensity modulation. There will therefore now be described certain embodiments of the invention which are particularly adapted for use in color television receivers using high beam-accelerating potentials.

Figure 6:
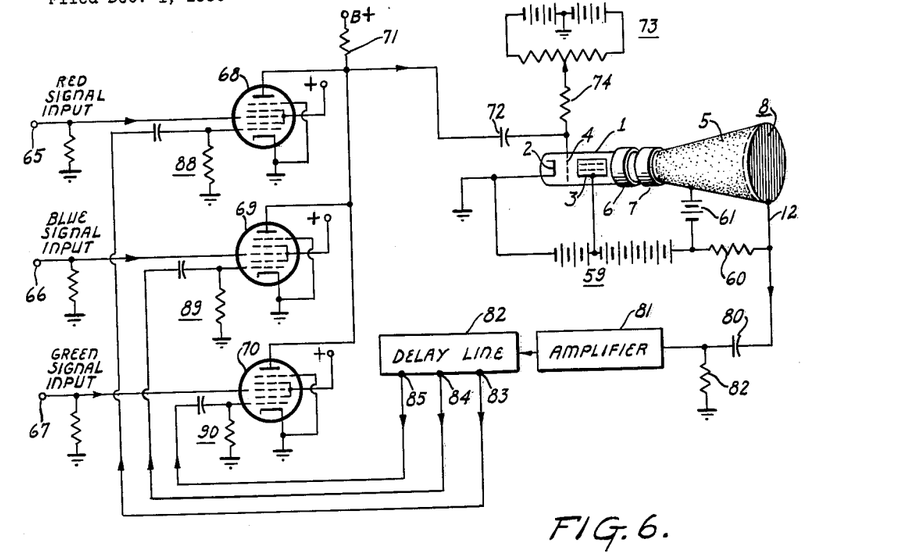
FIGURE 6 is a representation, principally schematic, of a system in which the invention is employed to produce color images in response to color television signals.

Referring now to FIGURE 6, in which numerals corresponding to those of FIGURE 1 indicate corresponding parts, the system represented therein operates to apply signals representative of the red, blue, and green components of light from a televised scene, to the intensity-controlling element 4 of cathode-ray tube 1 upon the impingement of those regions of screen member 8 which produce light of the corresponding color, in general accordance with the broad disclosure of the above-cited copending application of David E. Sunstein. Thus, there is employed cathode-ray tube 1 having an electron-emissive cathode 2, a beam-forming first anode 3, a beam-intensity controlling electrode 4, an accelerating second-anode 5, a focusing coil 6, a deflection yoke 7, and a beam-interceptive screen member 8, together with associated potential sources for maintaining second-anode 5 at a high positive potential with respect to cathode 2, and preferably somewhat positive with respect to screen member 8. Also, as in FIGURE 1, first anode 3 is maintained positive with respect to cathode 2, while focusing coil 6 and deflection yoke 7 are provided with suitable currents for causing the scanning of a conventional television raster upon screen member 8 by a focused beam. In the present instance, cathode 2 is grounded, while screen member 8 is supplied with a high positive potential from voltage source 59, by way of isolating resistor 60. Second-anode 5 is maintained somewhat positive with respect to screen member 8 by means of potential source 61 connected between the source of potential 59 and second-anode 5. In typical applications, the voltage supplied to screen member 8 by potential source 59 may be of the order of twenty kilovolts, while that of potential source 61 may be of the order of three kilovolts.

Screen member 8 may preferably have the form represented in FIGURES 7 and 8, which is generally similar to that shown in FIGURES 2 and 3, except for the provision of spaces between successive color stripes and the use of indexing stripes which are wider than the color stripes by an amount which may be approximately equal to twice the width of the spot produced upon the cathode-ray tube screen by the beam. Referring to FIGURES 7 and 8, there are again employed color stripes such as 22, 23, and 24, but between these color stripes there are located interstices such as 62 and 63 which contain no phosphors and no indexing stripe. Further, the indexing stripes, such as 29, are somewhat wider than are the color stripes. Although this particular arrangement of screen member 8 provides certain advantages in the present application, as will become more apparent hereinafter, the geometric form of the various stripe regions may differ considerably from that shown in FIGURE 7, while still being usable in systems of the general class represented in FIGURE 6. However, in explaining the operation of the system of FIGURE 6, it will at least be assumed that the spacings of the various color stripes from the center of the immediately preceding indexing stripe, are substantially the same for all color triplets.

Color-signal input terminals 65, 66 and 67 are supplied from a television receiver with separate signals indicative of the red, blue, and green components of the televised scene, respectively, which signals preferably have had their D.-C. components restored, and are of such polarity that the more positive portions thereof correspond to darker regions of the television image. The system then operates to sample these three color signals in sequence so that the red video signal controls the cathode-ray beam intensity upon impingement of the red stripe 22, the blue video signal is controlling upon impingement of the blue stripe 23, and the green video signal controls the beam intensity when the green stripe 24 is impinged. Accordingly, the three video input signals are supplied to intensity-controlling electrode 4 through sampling tubes 68, 69 and 70, respectively. Sampling tube 68 may comprise a pentagrid vacuum tube which has its suppressor and cathode grounded, its second and fourth grids, connected to a suitable source of positive screen potential, its third grid supplied with the red video signal to be sampled, its first grid supplied with a sampling signal for rendering tube 68 conductive only during predetermined portions of the sampling signal, and its plate connected to a source of positive potential designated B+ through a plate load resistor 71. Sampling tubes 69 and 70 may be substantially identical with sampling tube 68, being supplied at their respective third grids with the blue and green video signals, respectively, and having their respective plates connected to the source of potential B+ through the common plate load resistor 71. By supplying each of the color-signals sampling tubes, at the first grids thereof, with sampling signals whose positive peak values coincide in time with impingement of the corresponding color stripes of cathode-ray tube screen member 8, the applications of the color samples to intensity-controlling electrode 4 are caused to occur at the proper times.

In order to insure that distinct indexing signals are produced in response to impingement of indexing stripes, intensity-controlling electrode 4 is supplied with a biasing potential which is such as to produce, in the absence of color signals, an intense cathode-ray beam and consequently strong secondary emission when the indexing stripes are impinged. Although in some instances the potentials employed in the system may be such as to permit direct connection of the low-potential terminal of resistor 71 to intensity-controlling electrode 4, in the present arrangement this conection is made through blocking condenser 72, and biasing potential is supplied to electrode 4 from potential source 73, by way of grid resistor 74. By these means, independent adjustment of the bias of electrode 4 is enabled.

Screen lead 12, at which there are developed indexing signals which vary in accordance with the secondary-emission current from screen member 8, is coupled through capacitor 80 to the input of amplifier 81, whence there is connected a resistor 82 to ground, the value of which latter resistor may be small compared to that of resistor 60. Amplifier 81 is characterized by sufficient gain to amplify the indexing signals supplied thereto to a conveniently usable level, and may be adapted to do so without distortion of the indexing pulse wave-form, although this is not essential so long as the phase characteristics of the amplifier are such that the positive peaks of the amplified output signals therefrom occur in predetermined time relationship to the times of occurrence of peaks produced in the signal at screen lead 12 in response to impingement of indexing stripes.

The output signals from amplifier 81 are supplied to the input of delay line 82, which is provided with three taps 83, 84, and 85. Delay line 82 may comprise a series of filter sections designed in accordance with principles well known in the art so as to provide a total delay for signals passing therethrough which is at least as great as the average time required for the cathode-ray beam to scan from the center of one indexing stripe to the center of the next subsequently-impinged green phosphor stripe, and is preferably terminated in its characteristic impedance so as to minimize reflections from the termination thereof.

Tap 83 is spaced from the input of delay line 82 by an amount sufficient to provide a signal delay therebetween substantially equal to the average time required for the cathode-ray beam to sweep from the center of an indexing stripe to the center of the adjacent red phosphor stripe, tap 84 is spaced from tap 83 by an amount sufficient to provide a value of signal delay therebetween substantially equal to the average time required for the cathode-ray beam to travel from the center of a red phosphor stripe to the center of the next adjacent blue phosphor stripe, while tap 85 is spaced from tap 84 by an amount sufficient to provide a signal delay substantially equal to the average time required for the cathode-ray beam to sweep from the center of a blue phosphor stripe to the center of the next adjacent green phosphor stripe.

The signal at tap 83 comprises a red-signal sampling signal which is supplied through a resistance-capacitance circuit 88 to the first grid of red signal sampler tube 68 so as to produce actuation thereof and thereby effect application of a sample of the red video input signal to the intensity-controlling electrode 4 of cathode-ray tube 1. The time constant of resistance-capacitance network 88 is sufficiently long, compared to the period of the sampling signal from tap 83, so that leveling upon the peaks of the sampling signals supplied thereto from tap 83 is effected, and actuation of sampling tube 68 is caused to occur only during a predetermined relatively brief interval surrounding the time at which the sampling signal attains its peak values. Similarly, the signal at delay line tap 84 is supplied through resistance-capacitance network 89 to the first grid of sampler tube 69 so as to effect sampling of the blue video signal when the sampling signal at tap 84 attains its maximum values. Finally, the signal at tap 85 is supplied through resistance-capacitance network 90 to the first control grid of green sampler tube 70, so as to effect actuation thereof contemporaneously with the attainment of peak values by the sampling signal at tap 85.

Figure 9:
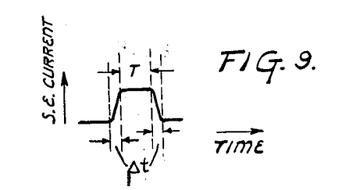
FIGURE 9 is a graphical representation of a current wave form, which is useful in explaining the operation of the system of FIGURE 6.

The operation of the system of FIGURE 6 differs from that of FIGURE 1 in that only the varying components of secondary-emission current are utilized to provide indications of beam position, and in that the intensity of the cathode-ray beam is caused to have its greatest value in the absence of color signal samples and is reduced upon the occurrence of color-signal samples by amounts determined by the contemporaneous values of the color signals. Thus, in the absence of color-signal samples, intensity-controlling electrode 4 is operated at its most positive value, which equals the biasing voltage supplied thereto through resistor 74. The resultant high-intensity beam produces a substantial increase in secondary-emission current from screen member 8 when indexing stripes are impinged. Such a pulse of secondary-emission current is represented in FIGURE 9, in which the secondary-emission current produced in response to impingement of an indexing stripe such as 29 of FIGURE 8, as indicated by the ordinates of the graph, is seen to possess a substantially uniform peak value for a time T substantially equal to the time required for the beam to scan across each of the color stripes. The pulse rises to, and falls from, this maximum value during time intervals of duration $\Delta t$ determined principally by the time required for the scanning spot of finite width to traverse the boundaries of the indexing stripes. Since the beam is at full intensity during impingement of the indexing stripe, and since the secondardy-emission ratio of the indexing stripe is substantially greater than that of the conductive film 28, the secondary-emission current produced during the indexing pulse is greater than that produced upon impingement of the conductive film regardless of modulation of the beam intensity by color signals. This pulse of secondary-emission current therefore produces a positive indexing pulse of voltage at screen lead 12 which is readily distinguishable, and which is utilized to control the application of color-sample signals to intensity-controlling electrode 4 in such manner that a color-image may be produced upon screen member 8.

Although resistor 60 comprises the direct-current load for the secondary-emission current, the alternating component of the secondary-emission current also flows through condenser 80 and resistor 82, and, since condenser 80 is of a relatively large value while resistor 82 has a value relatively low compared to that of resistor 60, the resistive component of the alternating-current load is determined principally by the value of resistor 82. In view of the distributed capacity existing between screen lead 12 and ground, it is desirable in some instances to employ a value of resistor 82 which is sufficiently small, as determined by well-known principles, to provide a suitably wide frequency bandwith, if the video characteristics of the signal are to be preserved. However, in some instances in which only the fundamental component of the indexing signals is to be utilized, resistor 82 may be replaced by an inductance which resonates with the distributed capacity at the fundamental frequency of the indexing signals.

The input signal to amplifier 81 then comprises principally voltage pulses which have the general form of the secondary-emission current pulse of FIGURE 9, and which occur contemporaneously therewith. In some applications of the invention, amplifier 81 may be designed to amplify the pulses supplied thereto without appreciable distortion, and to supply them in substantially unchanged form to delay line 82, whence they are supplied by way of delay line taps 83, 84, and 85 to red, blue, and green sampler tubes 68, 69, and 70, respectively, to effect actuation thereof when the beam impinges the red, blue, and green phosphor stripes respectively. The red signal sampler tube 68 is then actuated by the indexing pulses supplied to its first control grid through long time-constant resistance-capacitance network 88 from delay line tap 83, network 88 cooperating with the first control grid and cathode of tube 68, acting as a diode, to produce a leveling action with respect to the peaks of the sampling pulses supplied thereto in a manner well known in the art, so as to permit the flow of current in tube 68 substantially only during the period T of peak value of each sampling pulse supplied thereto. The operation of such circuits is set forth fully in the above-cited copending application of David E. Sunstein, and need not be described here in detail. Due to the above-described value of delay of signals at tap 83 relative to those at the input of delay line 82, and to the specified duration of the indexing pulse, the time interval of complete actuation of sampler tube 68 is substantially coextensive with the impingement of the red phosphor stripe which is scanned immediately after impingement of the indexing stripe from which the red signal sampling pulse is derived. During actuation of tube 68, current is caused to flow through common plate resistor 71, thus reducing the voltage at electrode 4 to a value determined by the contemporaneous value of the red signal supplied to the third grid of tube 68. In this manner, the beam intensity is caused to assume a reduced value upon impingement of the red stripe, such that the intensity of red light then produced corresponds to that of the red component of light from the corresponding portion of the televised scene.

Following the termination of actuation of red sampler tube 68, the blue sampler tube 69 is actuated contemporaneously with the impingement of the adjacent blue phosphor stripe so as to produce a blue component in the light from the impinged color triplet which is substantially equal to the blue component of the corresponding region of the televised scene. As control of the beam intensity is shifted from sampler tube 68 to sampler tube 69, there may be a tendency for the beam intensity to return toward its maximum value, rather than to be properly controlled by either the red or blue input signals. However, at such times the beam impinges regions such as 62 of FIGURE 7, which are located between red and blue phosphor stripes and which contain no phosphor, and hence substantially no interfering light emission is produced at these times.

When the beam has scanned across the blue phosphor stripe, it then impinges another region such as 63 which contains no phosphor, as control of the beam intensity is shifted to green sampler tube 70 in response to the sampling pulse from tap 85. During the period in which tube 70 is fully actuated, the beam impinges a green phosphor stripe such as 24, and is controlled by the green video signal.

Upon the termination of impingement of the green phosphor stripe, the voltage applied to intensity-controlling electrode 4 returns to its full maximum value, and the next indexing stripe is impinged by a beam of maximum intensity. The resultant distinctive indexing pulse is then utilized in the manner described above in connection with the previous indexing pulse, and the cycle of operation is repeated.

Although the operation of the system of FIGURE 6 has been described with reference to an arrangement in which amplifier 81 has a sufficiently wide band to preserve the shape of the pulse applied thereto, there are many applications in which the frequency passband required for such operation is so great as to be difficult or impractical of attainment. However, in such systems the variations in the repetition rate of the indexing pulses are generally not excessive, and amplifier 81 may be readily arranged to pass at least the fundamental frequency of the indexing signal. When only the fundamental frequency is passed, the output of amplifier 81 may comprise a substantially sinusoidal sampling signal, the positive peaks of which occur substantially contemporaneously with the impingement of the centers of indexing stripes. The resultant time-displaced sampling oscillations from delay line taps 83, 84 and 85 may then be employed to effect sequential actuation of sampler tubes 68, 69, and 70 during time intervals of predetermined duration centered about the times of occurrence of the peaks of the sampling oscillations supplied thereto. To obtain actuation of the sampler tubes for intervals of the preferred duration T equal to the time required to scan a color stripe, each sampling sinusoid may be converted to a series of pulses of duration T by means of additional clipping and shaping circuits of well known design. However, such additional circuits are not required if the sampling tube circuits, including the resistance-capacitance networks connected to the first grids thereof, are adjusted so that substantially complete actuation of each sampler tube occurs for a time T centered about the time of occurrence of the peak of the sampling sinusoid applied thereto. Such an adjustment may readily be made in accordance with principles well known in the art.

By means of the above-described circuit arrangement, the intensity of the cathode-ray beam is caused to possess a predetermined, distinct value when indexing stripes are impinged so as to produce readily distinguishable indexing pulses, while modulation of the beam intensity by successive samples of the three color signals is effected only in the intervals between successive impingement of indexing stripes thereby to permit the independent formation of a color image upon screen member 3 without adverse effect upon the operation of the indexing system.

Figure 10:
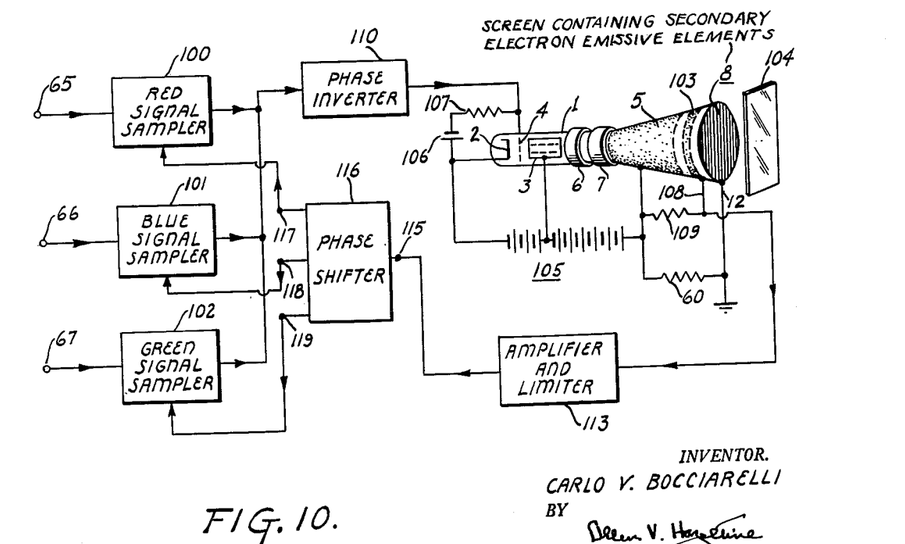
FIGURE 10 is a diagram, partly schematic and partly in block form, of another embodiment of the invention as it may be applied to a color television receiver.
Figure 11:
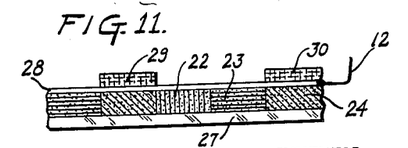
FIGURE 11 is an enlarged top view of a region of an indexing screen member which is particularly useful in the system of FIGURE 10.

FIGURE 10 represents another system embodying the invention, which is particularly useful when utilized in connection with a screen member having the general form illustrated in FIGURE 11. Referring to FIGURE 11, in which corresponding numerals indicate corresponding parts, the screen member represented therein differs from that of FIGURE 3 principally in that the indexing stripes, such as 30, are located in registry with phosphor stripes of a predetermined color, and the regions between successive color triplets, formerly occupied by the indexing stripes, are eliminated by readjustment of the widths or of the number of the color stripes. Thus, indexing stripe 30 is located in registry with green color stripe 24, and the various color stripes are located immediately adjacent each other across the transverse dimension of the cathode-ray tube screen. To permit substantial actuation of the green phosphor stripe despite the interposition of the gold indexing stripe, the gold indexing stripe should be made sufficiently thin to permit the electron beam to pass, at least in part, through the indexing stripe to the green phosphor stripe. However, the indexing stripe should be as thick as is possible in view of this requirement, so as to produce a substantial number of secondary electrons in response to impingement by the beam. As in FIGURES 3, 4, 5 and 8, the relative geometric proportions of the various elements of the screen member as represented in the drawing, are chosen for convenience in illustration only.

The practical advantages which may be obtained by utilizing a screen member such as that of FIGURE 11 include the fact that a greater number of color stripes per lateral inch may be obtained on a screen of predetermined dimensions and with color stripes of predetermined width, since the indexing stripes no longer occupy lateral space in the plane of the color stripes, or, alternatively, a screen having the same number of color stripes per lateral inch as that of FIGURE 3 may be constructed with greater ease due to the permissibility of utilizing color stripes of greater width.

When such a screen member is utilized, the difficulty arises that the method employed in the system of FIG- URE 6 for producing distinct indexing pulses in the presence of picture modulation of the cathode-ray beam cannot readily be employed, due to the fact that the intensity of the beam upon impingement of the indexing stripe cannot be returned to a fixed reference level, but must be controlled in response to the contemporaneous value of the green video signal. This difficulty is overcome by the arrangement of FIGURE 10.

Referring now to FIGURE 10 in detail, numerals utilized hereinbefore are again used to indicate corresponding elements. Thus there is again employed cathode-ray tube 1, having a cathode 2, a first anode 3, an intensity-controlling electrode 4, a second-anode 5, a focusing coil 6, a deflection yoke 7, and a beam-interceptive screen member 8. The three primary color signals to be applied sequentially to intensity-controlling electrode 4 are supplied to input terminals 65, 66 and 67 as before, and through red signal sampler 100, blue signal sampler 101, and green signal sampler 102, respectively, to intensity-controlling electrode 4, which samplers may employ circuits similar to those described in connection with sampler tubes 68, 69 and 70 of FIGURE 6. However, the potentials supplied to the various elements of cathode-ray tube 1 are differently arranged than in FIGURE 6, and there are employed, additionally, a separate ring collector 103, and a light-attenuating glass plate 104, the purposes of which will become apparent hereinafter.

As in the arrangement of FIGURE 6, screen member 8 is maintained at a high positive potential with respect to cathode 2, in this instance by means of potential source 105, the positive terminal of which is connected to screen lead 12 through screen load resistor 60. The latter terminal of source 105 is also connected directly to second-anode 5. First anode 3 is maintained positive with respect to cathode 2 by means of a tap upon potential source 105, while intensity-controlling electrode 4 is biased negatively with respect to cathode 2 by means of biasing battery 106, which supplies negative potential to electrode 4 through grid resistor 107. However, it is to be noted that in the embodiment of FIGURE 10, screen lead 12 is grounded, and cathode 2 is operated at a large negative potential with respect to ground. This grounding of the screen lead is of practical advantage in the present system for reasons to be explained hereinafter.

Collector 103 may comprise a coating of the same conductive material ordinarily utilized in the second-anodes of cathode-ray tubes, arranged in the form of a ring upon the interior surface of cathode-ray tube and intermediate screen member 8 and second-anode 5. However, when high frequency indexing signals are to be produced, the ring preferably comprises a material of low electrical loss, such as silver, for example. This collector is provided with a lead 108 which permits connection to external elements. Although not essential to the practice of the invention, such a ring, employed as a collector of secondary electrons, has the advantage of possessing less capacity to ground than does the ordinary second-anode 5, and thus provides a greater shunting impedance to ground for the desired, high-frequency indexing signals. Thus collector 103 performs a function similar to that performed by second-anode 5 in the embodiment of FIGURE 6, and is supplied, through a collector load resistor 109, with a positive potential from source 105 which is equal to that supplied to screen member 8. Although a greater quantity of secondary electrons will generally be collected if the collector is operated somewhat positive with respect to the screen member as in FIGURES 1 and 6, an adequate supply of secondary electrons may also be collected when the collector is at substantially the same potential as the screen member, and the collector current thus derived is also substantially proportional to the secondary-emission ratio of the impinged portion of the screen member.

In the operation of the portion of the system of FIGURE 10 thus far described, the focused cathode-ray beam is caused to scan across screen member 8 with a predetermined minimum intensity which is sufficient to produce substantial numbers of secondary electrons when indexing stripes are impinged, so that a substantial collector current then exists. This is accomplished by utilizing a value of negative potential from potential source 106 which maintains intensity-controlling electrode 4 at a potential which is less negative than that which produces complete cut-off of the cathode-ray beam. Light-attenuating plate 104 then provides an attenuation of light from screen member 8 which is just sufficient to cause the screen to appear substantially black to an observer, when it is subjected to the minimum illumination corresponding to the above-mentioned minimum beam intensity.

Upon impingement of the various colored-phosphor stripes, the beam intensity is then caused to increase to values which are substantially proportional to the contemporaneous values of the corresponding color signals applied to the color-signal input terminals. To secure this operation, the input color video signals may be applied to input terminals 65, 66, 67 in such polarity that the synchronizing pulses and darker portions of the video signal extend in a negative direction, after which each signal is inverted in the process of sampling. The combined signals from the three signal samplers are then passed through a phase inverter 110 before application to intensity-controlling electrode 4 so as to regain the polarity condition existing at the input terminals.

In the event that the interposition of the gold indexing stripe between the source of the cathode-ray beam and the green phosphor stripe tends to result in a diminution in the amount of green light produced in response to electron impingement, the effective gain of the green signal sampler 102 may be made greater than that of samplers 100 and 101 by an amount sufficient to compensate for this tendency.

As the cathode-ray beam scans screen member 8, the secondary-emission current collected by collector 103 and passing through collector load resistor 109, is equal to the product $k_1(i_0 R)$ of the intensity $i_0$ of the impinging cathode-ray beam, the secondary emission ratio R of the impinged material, and a constant $k_1$ which is determined principally by the percentage of emitted secondary electrons which are collected by collector 103. In systems in which collection is substantially complete, $k_1$ is substantially equal to unity. In any event, the product $k_1 R$ may be considered as defining an effective secondary-emission ratio R', which represents the number of electrons collected by collector 103 for each electron incident upon screen member 8. The screen current passing through screen lead resistor 60, on the other hand, is proportional to the product, $i_0(1-R)$, of the beam intensity multiplied by the difference between the secondary-emission ratio of the impinged material and unity.

Now the voltage at collector lead 108, with respect to ground, is equal to the difference between the voltage drops in resistors 109 and 60. Since the potential drop in resistor 109 equals the product $r_{109} i_0 R'$, of the resistance $r_{109}$ of resistor 109, multiplied by the collector current, while the potential drop in resistor 60 equals the product $r_{60} i_0 (1-R)$ of the resistance $r_{60}$ of resistor 60 multiplied by the screen current, the difference voltage $e_c$ at collector 108 may be expressed as follows:

$$e_c = i_0 r_{60}(1-R) - i_0 r_{109} R' = i_0 [r_{60}(1-R) - r_{109} R']$$

By suitable choice of the ratio of the resistances $r_{60}$ and $r_{109}$, the collector voltage may be caused to vanish upon impingement of regions having a single, predetermined value of secondary-emission ratio, despite variations in the incident beam intensity $i_0$. Thus, denoting the secondary-emission ratio of conductive film 28 as $R_F$, it may be seen from the above formula that the collector voltage $e_c$ will vanish upon impingement of the conductive film, when $r_{109}R_F' = r_{60}(1-R_F)$, or, when $$\frac{r_{100}}{r_{60}} = \frac{1-R_F}{R_{F'}}$$

where $R_F'$ is the effective secondary-emission ratio of the conductive film, as defined above. By choosing the ratio between resistances $r_{109}$ and $r_{60}$ in accordance with the value of secondary-emission ratio characterizing the conductive film, in the manner indicated by the latter mathematical expression, signals are prevented from appearing at collector lead 108 upon impingement of conductive film 28, despite substantial variations in incident beam intensity. Although this ratio of resistances is often susceptible of ready calculation, it may also be determined by experimental variation of the values of resistors 60 and 109 together with concurrent observation of the values of collector voltage.

On the other hand, when the gold indexing stripes such as 29 and 30 of FIGURE 11 are impinged, the resultant increase in collector current and reduction in screen current produces a decrease in the potential across resistor 60 and an increase in that across resistor 109, with the result that the collector voltage $e_c$ attains a substantial negative potential with respect to ground upon the impingement of such indexing stripes. The above-described minimum beam intensity is such that the negative pulses thus produced at collector 108 upon impingement of indexing stripes are readily detectable, regardless of the application of color signals to intensity-controlling electrode 4, and, when the samples of the green video signal are such as to cause increases in beam-intensity upon impingement of indexing stripes, negative indexing pulses of even greater amplitude are produced at collector lead 108.

Systems such as the described above, for discriminating against those variations which tend to appear in the indexing signals in response to video modulation of the cathode-ray beam intensity, are described and claimed in U.S. Patent No. 2,644,855 issued July 7, 1953, to William E. Bradley.

The indexing pulses produced at collector 103 may be coupled to the input of amplifier and limiter 113, which may include tuned circuits as load impedances, and may be adjusted in accordance with principles well known in the art so as to provide substantial gain only for signal frequencies substantially equal to the average rate at which indexing stripes are traversed by the scanning cathode-ray beam, its bandwidth being sufficient to produce substantially uniform response for all frequencies through which this rate of stripe scanning may be expected to vary. As a result of the frequency-selective action of amplifier and limiter 113, the output signal therefrom comprises substantially only the fundamental component of the indexing pulses, and is substantially sinusoidal in form. The phase of this indexing sine wave then bears a predetermined relationship to the phase of the indexing pulse signals from collector lead 108, and may be utilized, after appropriate phase-shifting, to actuate the three signal samplers at appropriate times.

With regard to its limiting action, amplifier and limiter 113 may also be adapted, in accordance with principles known in the art, to reduce variations which may tend to occur in the amplitude of the indexing sine wave in response to similar variations produced in the intensity of the cathode-ray beam by the green signal samples, as the beam impinges indexing stripes. Circuits suitable for use in limiting the amplitudes of sinusoidal signals are well known in the art, and need not be described fully herein.

The limited and amplified indexing sine wave thus produced may then be applied to the input terminal 115 of phase-shifter 116, which is adapted to derive therefrom three separate sampling oscillations, so phased with respect to the indexing sine wave supplied thereto as to be suitable for effecting proper sequential actuation of the three color-signal samplers upon impingement of the various color stripes. Thus, the phase shift provided between the input terminal 115 of phase shifter 116, and output terminal 117 thereof may be such as to produce, at output terminal 117, a red-signal sampling oscillation which has its positive peak values at times when the cathode-ray beam arrives at the centers of the red phosphor stripes. This condition will generally obtain when the total phase shift of the fundamental component of the indexing signal, in traveling from collector lead 108 to terminal 117, is substantially equal to 120°. This sampling oscillation is then suitable for application to red-signal sampler 100, to effect actuation thereof upon impingement of red stripes. Similarly, a blue-signal sampling oscillation is produced at output terminal 118 of phase-shifter 116 for application to blue-signal sampler 101, the phase of which signal is delayed by 120° with respect to the red signal-sampling oscillation, and a third, green-signal sampling oscillation is produced at output terminal 119 of the phase-shifter, the phase of which is delayed by 120° with respect to the blue-signal sampling sine wave, so as to actuate the green signal sampler upon impingement of the green phosphor stripes. Thus, by means of the arrangement of FIGURE 10, indexing signals clearly indicative of the position of the intensity-modulated beam of a color-image forming, trichromatic cathode-ray tube are produced by utilizing indexing elements of distinctive secondary-emission ratio which are subject to impingement by the cathode-ray beam upon the attainment thereby of predetermined positions, by deriving output signals substantially proportional to the secondary-emission current produced in response to impingement by the beam, and by emphasizing variations produced in these output signals in response to differences in the secondary-emission ratios of the regions thus impinged, while discriminating against variations which tend to occur therein in response to modulation of the intensity of the incident beam.

While the invention has been described with reference to particular arrangements thereof, it is susceptible of embodiment in a variety of other forms without departing from the spirit of the invention. Thus, for example, the invention is not limited to use in systems employing vertically-disposed stripes of secondary-electron emissive materials as beam-position-indicating elements, which elements are so disposed as to be scanned transversely by a cathode-ray beam, but may instead employ beam-position-indicating elements of any of a variety of configurations, disposed in any of a variety of arrangements within the cathode-ray tube, as determined by the requirements of the particular system in which the invention is employed.

Having described my invention, I claim:

1. A signal indexing system for controlling the times at which samples of a signal are supplied to a beam-intensity controlling element of a cathode-ray tube, said system comprising: a cathode-ray tube having beam-interceptive means disposed therein, said beam-interceptive means comprising indexing elements of predetermined position and distinctive secondary-emission ratio; means responsive to secondary-emission currents from said beam-interceptive means to produce indexing signals indicative of the times of impingement of said indexing elements; a source of input signals to be supplied intermittently to said intensity-controlling element; controllably actuatable sampling means supplied with said input signals and operative upon actuation to supply samples of said input signals to said intensity-controlling element of said cathode-ray tube; and means responsive to said indexing signals for actuating said sampling means in predetermined time relation to the impingement of said indexing elements by said cathode-ray beam.

2. A cathode-ray tube structure for producing indexing signals indicative of the position of the cathode-ray beam thereof, said structure comprising a cathode-ray tube including means for producing a cathode-ray beam containing electrons of high energies, a beam-interceptive screen member comprising at least two groups of regions subject to electron impingement, one of said groups of regions comprising the element gold, and another of said groups of elements comprising the element aluminum.

3. An electron-sensitive target comprising a supporting surface containing a light-emissive area and a plurality of discrete signal-generating indicia disposed in spaced-apart relationship on said surface along a marginal edge of said light-emissive area, said light-emissive area comprising a plurality of parallelly disposed groups of phosphor lines, said lines individual to each group being constituted of phosphor materials capable of emitting light of a color component individual to that line, and said signal-generating indicia comprising a plurality of line-segments disposed in spaced apart register with selected ones of said phosphor lines.

4. In combination a cathode ray tube comprising an evacuated envelope, a screen positioned within said envelope adjacent one end thereof, said screen comprising a supporting layer, a plurality of groups of phosphor strips on the rear surface of said supporting layer, each of said groups of phosphor strips comprising a plurality of strips capable of emission of light of different selected component colors upon electron bombardment, a plurality of sensing strips of an electron permeable material on the rear surface of said phosphor strips in registration with selected phosphor strips and of a material having a different coefficient of incident electron reflection than said phosphor surface, means for scanning said screen transversely to said phosphor strips, and means for collecting the reflected electrons from said screen, said means comprising a collecting surface of a material of low secondary electron emission.

5. An electron-sensitive target according to claim 3, wherein said signal-generating indicia are substantially co-extensive in length with said phosphor lines.

6. An electron-sensitive target according to claim 5, wherein said signal-generating indicia are composed of material which is emissive of secondary electrons to generate an indexing signal.

7. An electron-sensitive target according to claim 5, wherein said signal-generating indicia are disposed behind selected ones of said phosphor lines.

8. An electron-sensitive target according to claim 5, further including an electron-permeable light-reflecting layer interposed between said phosphor lines and said signal-generating indicia.

9. In a color image-producing cathode ray tube having an image screen, a plurality of parallelly disposed groups of phosphor stripes on said screen, the phosphor stripes of each of said groups being emissive of light of different colors in response to electron impingement, a plurality of spaced indexing stripes on said screen extending substantially parallel and positionally related to said groups of phosphor stripes, said indexing stripes being emissive of secondary electrons in response to electron impingement, and means for collecting the secondary electrons emitted by said indexing stripes to produce an indexing signal which, by reason of the positional relationship of said indexing stripes to said groups of phosphor stripes, is indicative of the times of electron impingement on said groups of phosphor stripes.

10. In a color image-producing cathode ray tube having an image screen and means for effecting line-by-line scanning of said screen by the cathode ray beam, a plurality of groups of phosphor stripes on said screen extending substantially transversely of the direction of line scanning, the phosphor stripes of each of said groups being emissive of light of different colors in response to electron impingement, a plurality of spaced indexing elements on said screen extending substantially transversely of the direction of line scanning and positionally related to said groups of phosphor stripes, said indexing elements being emissive of secondary electrons in response to electron impingement, and means for collecting the secondary electrons emitted by said indexing elements to produce an indexing signal.

11. In a color image-producing cathode ray tube, a screen structure comprising a light-transparent supporting plate arranged to be viewed from one side, a plurality of parallelly disposed groups of phosphor stripes supported upon the other side of said plate, the phosphor stripes of each of said groups being emissive of light of different colors in response to electron impingement, an electron-permeable light-reflecting layer supported upon said groups of phosphor stripes, and a plurality of secondary electron-emissive indexing stripes supported upon said layer and disposed substantially parallel and in predetermined positional relation to said groups of phosphor stripes.

12. A color image-producing cathode ray tube according to claim 11, wherein said indexing stripes are positioned behind phosphor stripes which are emissive of light of a particular color.

13. A color image-producing cathode ray tube according to claim 11, wherein said groups of phosphor stripes are spaced apart, and said indexing stripes are positioned behind the spaces between said groups.

14. A screen structure for cathode ray tubes, said structure comprising an electron-permeable layer of conductive material, a plurality of strips of phosphor materials disposed generally parallel to each other on one side of said conductive layer, different ones of said strips being made of phosphor materials responsive to electron impingement to emit light of different colors, and a plurality of strips of a material having a secondary electron emission ratio substantially different from that of said conductive material, said last-named strips being disposed on the other side of said conductive layer and in predetermined geometrical relationship to said phosphor strips.

15. A screen structure for cathode ray tubes, said structure comprising an electron-permeable layer of conductive material, a plurality of strips of phosphor materials disposed generally parallel to each other on one side of said conductive layers, different ones of said strips being made of phosphors responsive to electron impingement to emit light of different colors, the phosphor strips emissive of light of any particular color being recurrent across said screen structure, and a plurality of strips of a material having a secondary electron emission ratio substantially different from that of said conductive material, said last-named strips being disposed on the other side of said conductive layer in predetermined geometrical relationship to said phosphor strips emissive of light of a particular color.

16. A screen structure for cathode ray tubes, said screen structure comprising an electron-permeable layer of conductive material, a plurality of generally parallel strips of phosphor materials disposed on one side of said conductive layer, certain ones of said strips being made of phosphor materials emissive of light of one color in response to electron impingement and others of said strips being made of phosphor materials emissive of light of other colors, and a plurality of strips of a material having a secondary electron emission ratio which is substantially different from that of said conductive material, said last-named strips being disposed on the other side of said conductive layer and in predetermined geometrical relationship to said phosphor strips emissive of light of one color.

17. A screen structure for cathode ray tubes, said screen structure comprising an electron-permeable layer of conductive material, a plurality of strips of phosphor materials disposed generally parallel to each other on one side of said conductive layer, certain ones of said strips being made of phosphors emissive of light of one color in response to electron impingement and others of said strips being made of phosphors emissive of light of other colors, said phosphor strips emissive of light of one color being recurrent with predetermined periodicity, and a plurality of strips of a material having a secondary electron emission ratio substantially different from that of said conductive material, said last-named strips being disposed on the other side of said conductive layer in registry with said phosphor strips emissive of light of one color.

18. In a cathode ray tube, a screen structure comprising an electron-permeable layer of conductive material, a plurality of strips of phosphor materials disposed generally parallel to each other on one side of said conductive layer, different ones of said strips being made of phosphor materials responsive to electron impingement to emit light of different colors, and a plurality of strips of a material having a secondary electron emission ratio substantially different from that of said conductive material, said last-named strips being disposed on the other side of said conductive layer and in predetermined geometrical relationship to said phosphor strips, means for impinging electrons upon said screen structure, and means for deflecting all of the electrons which impinge on said screen structure at substantially the same rate in a direction transverse to said phosphor strips.

19. A system for displaying images in color including in combination, means for producing a beam of electrons, fluorescent means including elongated strip-like portions positioned in the path of said beam, said portions being constructed of materials arranged in a repeating series so that different predetermined colors are produced as said portions are impinged by said beam, means for deflecting said beam across said fluorescent means, a conductive sheet positioned in the path of said beam adjacent said fluorescent means, a grid structure formed of material having different secondary emission properties than that of said conductive sheet, said grid structure including elongated portions extending substantially parallel to said portions of said fluorescent means, and means controlled by the secondary emission from said grid structure coupled to said beam deflecting means to vary the position of said beam with respect to said elongated portions of said grid structure to hold said beam in predetermined relation with respect thereto.

20. A system for displaying images in color including in combination, means for producing a beam of electrons, fluorescent means including elongated portions positioned in the path of said beam, means for deflecting said beam across said fluorescent means, said portions being constructed of materials arranged so that a repeating series of different predetermined colors are produced as said beam is deflected across said fluorescent means, a conductive sheet positioned in the path of said beam adjacent said fluorescent means, a grid structure formed of material having different secondary emission properties than that of said conductive sheet, said grid structure including elongated portions extending substantially parallel to said portions of said fluorescent means, and control means for said system responsive to the secondary emission from said grid structure.

21. Apparatus for displaying images in color including in combination, means for producing a beam of electrons, fluorescent means including elongated strip-like portions positioned in the path of said beam, said portions being constructed of materials arranged so that a repeating series of different predetermined colors are produced thereby when impinged by said beam, a conductive sheet positioned in the path of said beam adjacent said fluorescent means, and a grid structure formed of material having different secondary emission properties than that of said conductive sheet, said grid structure including elongated portions extending substantially parallel to said portions of said fluorescent means.

22. Apparatus for displaying images in color including in combination, means for producing a beam of electrons, fluorescent means including elongated portions positioned in the path of said beam, said portions being constructed of materials and arranged to produce a repeating series of different predetermined colors when impinged by said beam, a metallic sheet positioned in the path of said beam adjacent said fluorescent means, and a grid structure deposited on said metallic sheet and including elongated portions extending parallel to said portions of said fluorescent means, said grid structure being formed of material which, when impinged by said beam of electrons, produces less secondary emission than that produced by said metallic sheet.

23. In a color television system, and in combination, a screen having a cyclically repeated plurality of sets of parallel strips, each set comprising strips corresponding in number and in predetermined order to a number of component colors to be reproduced, means for scanning the said screen by moving an electron beam transversely of the strips for successively scanning the lines, means responsive to the electron beam for generating a signal in timed relation to the scanning thereby of the strips, and color selecting means controlled by the said signal and operating to decrease the scanning speed of the beam over predetermined strips of the said sets.

24. Cathode ray tube apparatus for reproducing television signals in color comprising a cathode ray tube having an electron gun, a screen and a target grid electrode, said screen comprising phosphor strips adapted to fluoresce in the three primary colors and arranged side by side to form a plurality of three color phosphor strip groups, each of said groups being positioned between conductors of said target grid electrode, means for deflecting the beam of said cathode ray tube across said phosphor groups and said conductors for producing a voltage pulse each time said beam intercepts one of said conductors, means for producing a substantially sinusoidal voltage wave corresponding to the voltage pulses produced by said beam intercepting said conductors of said target grid electrode, a phase splitting circuit connected to said last mentioned means for developing three phase voltage waves from said substantially sinusoidal wave so that the maxima of different ones of said three phase voltage waves correspond in time relation to the scanning by said beam of different ones of the respective three color phosphor strips, means for adding said three phase voltage waves individually to a different color video signal in the same sequence as the same color phosphor strip is scanned, means connected to said last mentioned means for rectifying said added voltage waves and for producing pulses each of which have a width that does not exceed 120 degrees of the cycle of said substantially sinusoidal wave, and means for controlling said beam in accordance with the voltage pulses produced by said last mentioned means so that different color phosphors of each of said groups may be caused to fluoresce in accordance with the corresponding color video signal.

25. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, and means responsive only to the interception of said electron beam by said signal elements for producing control signals independently of the presence of said video information.

26. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, means responsive only to the interception of said electron beam by said signal elements for producing control signals independently of the presence of said video information, and coding means triggered into operation solely by said control signals for modulating said electron beam with video information concerning a given primary component color in synchronism with the traversal by said beam of a phosphor area corresponding to that primary component color.

27. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, and means including said beam intercepting grid for deriving control signals only during the traversal of said electron beam across said blank areas independently of said video information.

28. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, means including said beam intercepting grid for deriving control signals only during the traversal of said electron beam across said blank areas, and coding means triggered into operation solely by said control signals for modulating said electron beam with video information concerning a given primary component color in synchronism with the traversal by said beam of a phosphor area corresponding to that primary component color, said coding means further permitting derivation of a fixed potential during the traversal of said beam past said blank areas.

29. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid spaced from said fluorescent screen and including a series of spaced signal elements arranged parallel to and in alignment with corresponding blank areas, deflection means for scanning said beam along said fluorescent screen in a direction substantially normal to said given direction, and means responsive only to the interception of said electron beam by said signal elements for producing control signals independently of the presence of said video information.

30. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid spaced from said fluorescent screen and including a series of spaced signal elements arranged parallel to and in alignment with corresponding blank areas, deflection means for scanning said beam along said fluorescent screen in a direction substantially normal to said given direction, means responsive only to the interception of said electron beam by said signal elements for producing control signals independently of the presence of said video information, and coding means triggered into operation by said control signals for modulating said electron beam with video information concerning a given primary component color in synchronism with the traversal by said beam of a phosphor area corresponding to that primary component color.

31. In combination, a cathode ray tube including means for producing an electron beam, an electron beam intensity control electrode, a fluorescent screen including a plurality of recurrent groups of elongated phosphor areas extending along said screen in a given direction and a plurality of elongated blank areas positioned between adjacent ones of said groups, each of said phosphor areas of a given group being productive of light of a different primary color when interceptive of said electron beam, an electron-permeable electrically conductive layer disposed in contact with said fluorescent screen, a beam intercepting grid positioned adjacent said fluorescent screen and including a multiplicity of spaced signal elements arranged parallel to and in alignment with corresponding blank areas and capable of emitting secondary electrons when impinged upon by said electron beam, deflection means for recurrently scanning said beam along said fluorescent screen in a direction substantially normal to said given direction, means responsive only to the interception of said beam by said signal elements for producing control signals, means for generating video signals corresponding to each of said primary colors, a source of fixed potential, and coding means triggered into operation by said control signals for modulating the intensity of said beam during the traversal of said beam past a phosphor area of a given primary color in accordance with a video signal representative of information concerning that primary color, said coding means further permitting application of said fixed potential to said intensity control electrode during the traversal of said beam past said blank areas.

32. In combination, a cathode ray tube including means for producing an electron beam, an electron beam intensity control electrode, a fluorescent screen including a plurality of recurrent groups of elongated phosphor areas extending along said screen in a given direction and a plurality of elongated blank areas positioned between adjacent ones of said groups, each of said phosphor areas of a given group being productive of light of a different primary color when interceptive of said electron beam, an electron permeable electrically conductive layer disposed in contact with said fluorescent screen, a beam intercepting grid positioned in contact with said layer and including a multiplicity of spaced signal elements arranged parallel to and in alignment with corresponding blank areas and capable of emitting secondary electrons when impinged upon by said electron beam, deflection means for recurrently scanning said beam along said fluorescent screen in a direction substantially normal to said given direction, means responsive only to the interception of said beam by said signal elements for producing control signals, means for generating video signals corresponding to each of said primary colors, a source of fixed potential, and coding means triggered into operation by said control signals for modulating the intensity of said beam during the traversal of said beam past a phosphor area of a given primary color in accordance with a video signal representative of information concerning that primary color, said coding means further permitting application of said fixed potential to said intensity control electrode during the traversal of said beam past said blank areas.

33. A television image reproducing system comprising, an image screen having a plurality of substantially parallel strip-like sections, means for generating an electron beam, raster forming means for scanning said beam transversely of said strips including beam deflection means and a scanning signal generator coupled to said beam deflection means to apply scanning signals thereto, means for developing a train of pulses in response to traversal of said strips by said beam, frequency discriminator means coupled to said pulse developing means for producing a potential corresponding to the time intervals between successive pulses of said train, and control circuit means connected between said frequency discriminator means and said raster forming means to modify said scanning signals in response to the magnitude of said potential.

References Cited in the file of this patent

UNITED STATES PATENTS

| | | |
|---|---|---|
| 2,415,059 | Zworykin | Jan. 28, 1947 |
| 2,529,485 | Chew | Nov. 14, 1950 |
| 2,532,511 | Okolicsanyi | Dec. 5, 1950 |
| 2,545,957 | Kell | Mar. 20, 1951 |
| 2,617,876 | Rose | Nov. 11, 1952 |
| 2,630,548 | Muller | Mar. 3, 1953 |
| 2,633,547 | Law | Mar. 31, 1953 |
| 2,660,684 | Parker | Nov. 24, 1953 |

FOREIGN PATENTS

| | | |
|---|---|---|
| 868,403 | France | Sept. 29, 1941 |
| 315,362 | Great Britain | Feb. 12, 1931 |